May 30, 1967

J. MORKOSKI 3,321,895

RAKE BASKET SUSPENSION SYSTEM

Filed March 9, 1964

INVENTOR.
James Morkoski
BY John J. Kowalik
Atty.

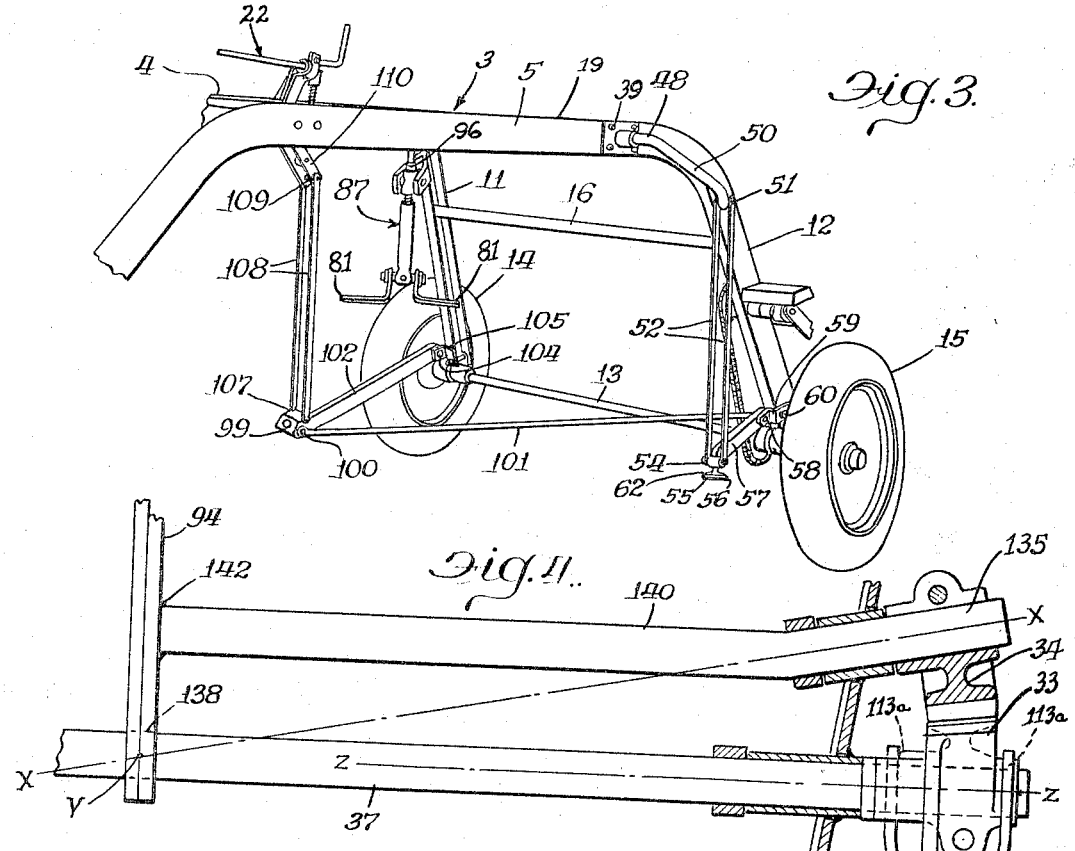
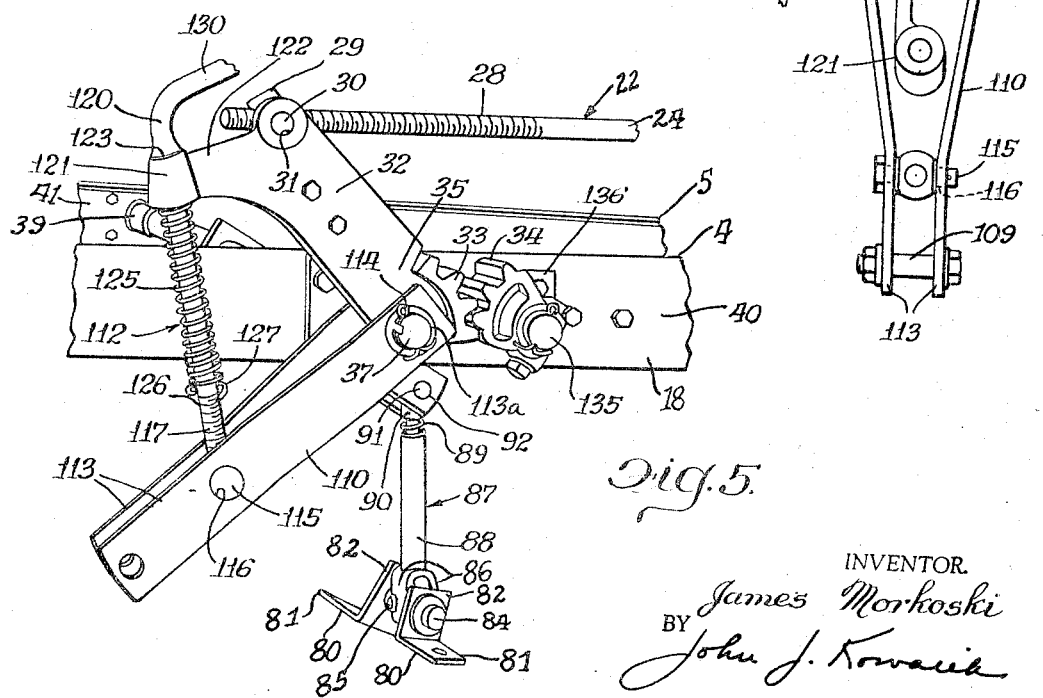

3,321,895
RAKE BASKET SUSPENSION SYSTEM
James Morkoski, Clarendon Hills, Ill., assignor to International Harvester Company, a corporation of Delaware
Filed Mar. 9, 1964, Ser. No. 350,274
6 Claims. (Cl. 56—377)

This invention relates to side delivery rakes and more specifically to mechanism for suspending the rake basket and cylinder.

Side delivery rakes are operated over different terrain and under different crop conditions. It is necessary to provide flexibility in the rake suspension to accommodate the rake to float and thus minimize scalping the ground and, furthermore, it is necessary to provide adjustment not only for elevating the rake but also to control or to adjust the pitch of the teeth for most advantageous raking operation in the respective crops in which the rake is being used.

A general object of the invention is to provide a novel and efficient and relatively inexpensive suspension for a side delivery rake basket and cylinder.

A further object of the invention is to provide a novel suspension system incorporating minimal linkage to effect various adjustments required.

A still further object of the invention is to provide a novel adjusting system wherein a single lift link is utilized to bodily elevate the raking cylinder and wherein the tilting and the leveling means is incorporated within the linkage.

These and other objects and advantages inherent in and encompassed in the invention will become more readily apparent from the specification and the drawings wherein:

FIGURE 3 is a further perspective view similar to FIGURE 1 with parts broken away and illustrating the linkage of a portion of the framework;

FIGURE 4 is a fragmentary plan view of the lifting linkage; and

FIGURE 5 is a side elevational view of the portion of the linkage shown in FIGURE 4.

Figure 1:
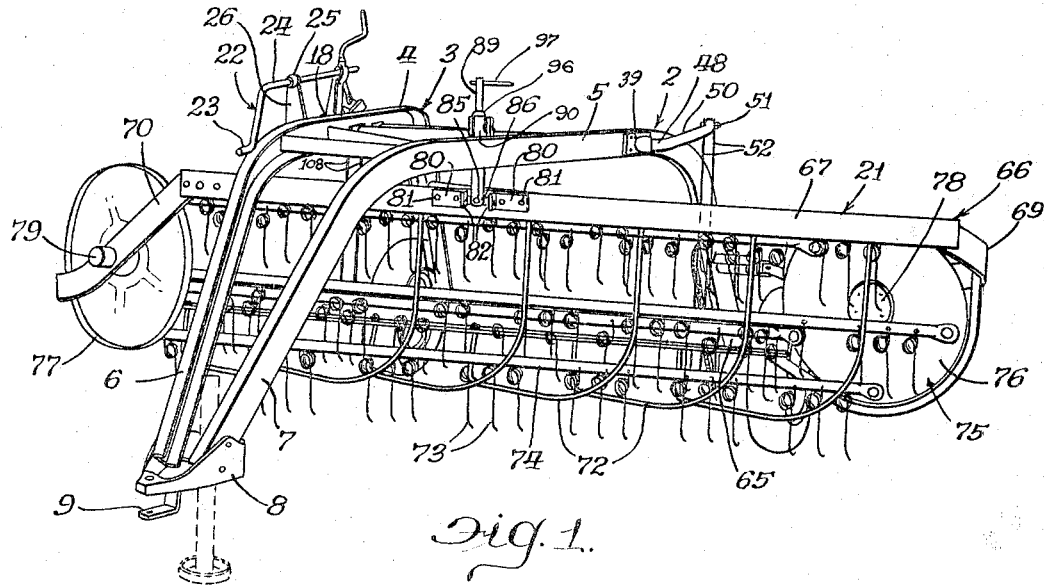
FIGURE 1 is a front perspective view of the side delivery rake incorporating the invention.
Figure 2:
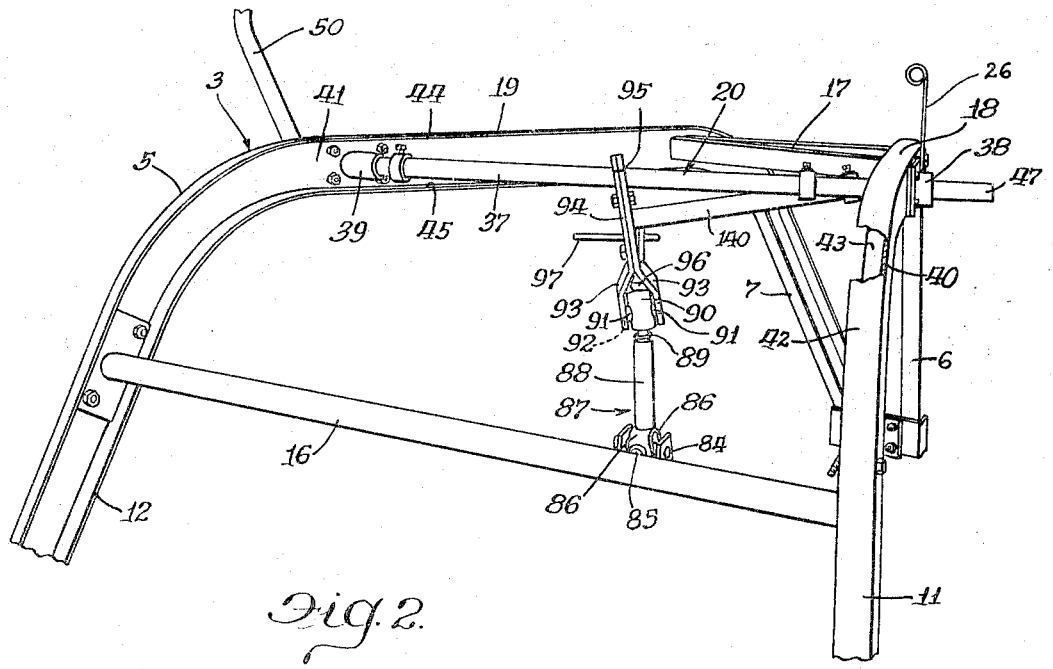
FIGURE 2 is a fragmentary rear perspective view of framework with portions of the linkage mounted thereon.

Describing the invention in detail, the side delivery rake generally indicated 2, comprises an arch frame generally indicated 3, said frame having a pair of forwardly converging channel-shaped side frame members 4, 5 which have downwardly extending forward portions 6 and 7 which are interconnected at their lower ends to a hitch bracket 8 which has a hitching jaw 9. The frame members 4 and 5 have downwardly extending rear end portions 11 and 12 which at their lower ends, are interconnected by an axle 13. The axle 13, outwardly of the members 11 and 12, mounts driving and support wheels 14 and 15. The members 11 and 12 are further interconnected adjacent to their upper ends by cross brace 16.

The members 4 and 5 are interconnected by a bracing 17 at the forward ends of their intermediate portions 18 and 19 which carry an implement suspension means generally designated 20, which, in the present instance is a rake 21 which extends transversely of the frame structure at an angle to the direction of travel as well known to those skilled in the art.

The suspension means comprises an operator generally designated 22 which includes a forward crank 23 connected to a generally horizontal fore-and-aft extending shaft 24 which overlies the portion 18 of the frame. The shaft 24 is journalled in a bearing assembly 25 and is held thereby against fore-and-aft movement or axial movement with respect to the support 26 which is mounted on the portion 18. The rear end portion 28 of the shaft 24 is threaded into a trunnion block 29 which has integral stub shaft means 30 journalled within openings 31 in the upper end of an arm or lever 32. The lever 32 is connected at its lower end to a first torque transfer portion 33 in the form of a sector spur gear which mates with a companion second torque transfer portion 34 which is also a sector spur gear. The lower end portion 35 of the lever 32 is pivoted on a generally horizontally disposed shaft 37. The shaft 37 is carried in bearing 38, 39, which are respectively mounted on the upright flanges 40, 41 of the U-shaped beam members 4 and 5 between the top and bottom webs 42, 43, 44, and 45 thereof. Thus, the shaft 37 is located on the neutral axis of the side beam members whereby utilizing the full strength of these beam members without in any way materially reducing the strength thereof because of the apertures formed within these upright walls for purpose of accommodating the bearings and the shaft 37 to extend with its end portions 47, 48 outwardly of the portions 18, 19, respectively. The end portion 48 is formed integral with a rearwardly extending arm means or arm portion or lever part 50 which, at its rear end, is provided with a horizontal bolt 51 extending through a pair of depending suspension means in the form of a pair of depending straps 52 which flank and embrace the rear end portion of the arm 50. The lower ends of the straps 52 are connected by means of a bolt 54 to an ear 55 on bracket 56, said bolt 54 also serving as a connection for the forward end of a stabilizing beam or bar 57, which is pivotally connected as at 58 to a mounting bracket 59 which is suitably secured as by a bolt 60 to the lower end of portion 12 of the frame structure.

The bracket 55 has a mounting flange 62 by means of which the bracket is connected by bolts to the rear beam 65 of the rake basket generally designated 66.

The frame of the rake basket in addition to the rear beam member 65 includes a front beam member 67 and end beam members 69, 70 which form a generally rhomboidal or parallelogram-like structure. These beam members 67, 65 support the usual stripper bars 72, 72 which interdigitate with the rake teeth 73 carried on the bars 74 of the rake cylinder generally designated 75.

The bars 74 are rotatably connected at opposite ends to the end members 76, 77 which are respectively journalled on parallel axially offset axes as at 78, 79 to the end beam members 69, 70 as well known to those skilled in the art.

The front beam member 67 of the rake basket is connected generally centrally thereof to the mounting flanges 80, 80 of a pair of opposed brackets 81, 81, said flanges 80 merging with outturned ears 82 which project forwardly from the beam member 67 in opposed generally parallel relation and pivot a trunnion pin 84. Pin 84 is pivotally connected intermediate its ends on a substantially horizontal axis at right angles to axis pivot by pin 85 which extends through ears 86 at the lower end of a suspension link generally designated 87. The ears 86 are formed at the lower end of a threaded tubular member 88 which has a threaded connection with the lower end of a bolt 89, said bolt 89 passing through a trunnion block 90 and rotatably interlocked therewith against axial displacement. The trunnion block 90 is provided with a pair of laterally extending pins 91 which are journalled or pivoted in openings 92 in the furcations 93 of a lever or arm means 94 which projects forwardly from the shaft 37 and has its rear end pivotally mounted as at 95 about said shaft 37. It will be seen that the bolt 89 is provided with a stop 96 which abuts against the upper side of the trunnion block 90 and the upper end of the bolt 89 is provided with a handle 97 for convenient turning of the bolt in threading and unthreading with respect to the lower portion 88. Thus, it will be seen that by threading or unthreading of the adjusting linkage 87, or tilting screw, the basket 21 is caused to swing upwardly and downwardly about the pivotal mounting 54 which is carried by the rear brace 51 and also about a similar mounting 99 which comprises a mounting bracket pivoted on bolt 100 to a front end portion of a reinforcing brace 101. It will be understood that the reinforcing brace 101 may be connected otherwise to the bracket 99 and the brace may be eliminated and the connection at 100 may be in the form of a nut-and-bolt assembly which may pass through the forward end of a stabilizing brace or means 102 which extends in a fore-and-aft direction between the rear of the basket and the beam member 11 and is pivoted as at 104 to a bracket 105 suitably mounted upon the lower portion of the beam portion 11. It will be understood that the connections of the stabilizer braces at each end are accomplished by loose holes and are in fact universal to permit various movements of the basket.

The beam 102 as well as the adjacent portion of the rake and rake basket are mounted from a bolt or pin 107 to the lower ends of a pair of suspension means or straps 108 which, at their upper ends, are pivoted by bolt 109 to a rearwardly extending arm portion or means 110.

The arm means 110 and 50 are functionally interconnected with shaft 37 and operate conjunctively due to rotation of the shaft 37. The arm means 110 is adjustably connected through the medium of the adjusting means 112 to the arm 32. The arm means 110 comprises a pair of rearwardly extending links 113 which, at their forward ends, are pivoted as at 113a about the shaft 37 and suitably secured thereon against axial displacement as by the cotter pin 114. The arm means 110 is connected to a trunnion pin 115, which extends through suitable openings 116 in the links 113, to the lower end of a threaded member 117. Adjusting member 117 forms with the arm means 32 and 110 a triangular arrangement and extends, at its upper end 120, through a bearing block 121 which is formed integral on an extension 122 of the arm 32. Extension 122 projects rearwardly and affords an abutment for a stop 123 which is formed integral with the upper portion 120 of the adjusting bolt 117. The bearing 121 also forms an abutment on its underside for the upper end of a spring 125 which at its lower end is seated on an abutment in the nature of a washer forming a seat for the spring 125. The spring 125 is compressed between the bearing 121 and the washer 126, the washer being held in position by the cotter key 127 which is suitably mounted through an appropriate opening in the bolt 117. Spring 125 serves to frictionally prevent free rotation of the shaft 117. Rotating of shaft 117 is effected by the crank 130 whereby the lower portion of the screw 117 is threaded or unthreaded with respect to the trunnion 115 and thereby the arm 110 is raised or lowered. This effects raising or lowering the adjacent end of the basket and the cylinder through movement of stops 108 and the connection 99 to the basket. This effects lateral tilt of the rake.

The basket and rake are bodily elevated or lowered by means of the crank 23 which is rotated whereby the arm 32 and shaft 37 will either swing in a clockwise direction as seen in FIGURE 5 for elevating the basket or in a counterclockwise direction for lowering the basket. Simultaneously with the rotation of the arm 32 the portion 33 of the gear sector will obtain an opposite direction of rotation to the shaft portion 135 which mounts the gear sector 34. The shaft portion 135 is carried from a bearing 136 on a neutral axis of the beam member 4 from the vertical web 40 of the beam member 4 and has an axis of rotation indicated at X—X which passes through the point Y located on the axis of rotation Z—Z of the shaft 37. Point Y is located at the mid-point of the pivot indicated at 95 of arm 94. The shaft 135 has a portion 140 which is angularly related to the portion 135 and provides a lifting arm connected rigidly, preferably as by welding at 142, to the forwardly extending lifting arm means 94 intermediate the ends thereof. Thus, it will be seen that the arm portion 140 gyrates about the axis 135 and lifts and lowers the arm 94 and therefore the forward end of the basket and the rake 21 with the lifting of the rear end of the basket through the medium of the shaft 37 and the arms connected therewith through the respective straps. It will be realized that adjustment to the pitch is effected by threading and unthreading of the bolt 89 and the lateral tilt adjustment is effected by threading and unthreading of the adjusting means 112.

Thus, a simple and effective arrangement has been disclosed for mounting and suspending an implement from a carrier said mounting being relatively inexpensive and being durable and free from malfunctioning and simple to use. The construction further effects the adjustment in an ingenious linkage arrangement which is simple and comprises a minimum number of parts.

Having described the preferred form of the invention, it will be understood that various other embodiments will become readily apparent to those skilled in the art within the scope of the appended claims.

What is claimed is:

1. In a side delivery rake, a support having a pair of side frame members, a rake structure beneath the frame elongated transversely to its direction of travel, and means suspending said rake structure from the frame members including a shaft extending transversely of the frame members, means journalling the shaft from the frame members on the neutral axis of the latter, first arm means on the shaft extending generally normal thereto, suspension means extending behind said structure and connecting said arm means therewith, and actuating means for operating said shaft for vertically swinging said arm means, and other suspension means including second arm means pivoted about said shaft and means extending from said second arm to in front of the raking structure and connected therewith and means for simultaneously moving said first and second arm means at the same rate about a common axis for lifting and lowering said rake structure in a rectilinear path.

2. In a rake, a support frame, a rake structure therebeneath, means suspending said structure from the frame and including a generally horizontal shaft, first arm means extending rearwardly from the shaft, second arm means extending forwardly of the shaft, certain of said arm means connected with the shaft and constrained for movement therewith and the other of said arm means pivotal on an axis about the shaft, means including a shaft having a first portion pivoted on the frame on an axis intersecting the axis of pivot of said other arm means and having a second portion angularly related to said first portion and connected to said other arm means at a point spaced from the axis of pivot of the other arm means, means suspending said rake structure at fore and aft spaced points from said first and second arm means, and a driving train connecting said shafts for rotation in preselected relationship.

3. The invention according to claim 2 and said driving train comprising a pair of mating gears connected respectively to said first mentioned shaft and to the first portion of the second mentioned shaft.

4. The combination of a carrying frame, an implement therebeneath, a lifting linkage suspending the implement from the frame and comprising first and second diametrically extending arm means journalled on the frame for vertical swinging movement about a common horizontal axis, means connecting respective arm means to the implement at horizontally displaced points, and means for conjunctively swinging all of the arm means for raising and lowering the implement and comprising torque transfer means having one portion rotatable about an axis of pivot coincident with the axis of pivot of the arm means and connected with the arm means having another portion rotatable about an axis intersecting the axis of rotation of the arm means at a point substantially coincident with the area of pivot of the second arm means extending in a direction opposite the first arm means and a lift member connected with the second portion and extending angularly with reference to the axis of pivot of the second portion and pivotally connected to the second arm means at a point displaced from the axis of pivot of the second arm means.

5. In a side delivery rake, a support frame, a rake therebeneath having lateral ends and front and rear sides, means mounting said rake from the frame including intermediate and end suspensions having universal connections with the rake respectively at the forward and rear sides thereof, means operatively connecting said suspensions to cause the same to concurrently raise and lower the rake at the front and rear sides thereof at the same rate and means operatively connected between one of the end suspensions and the frame for raising and lowering the respective suspension for laterally tilting the rake.

6. The invention according to claim 5 and means for tilting the rake about a longitudinal axis comprising means for varying the length of said intermediate suspension.

References Cited
UNITED STATES PATENTS

| | | | |
|---|---|---|---|
| 2,991,613 | 7/1961 | Breed | 56—377 |
| 3,107,476 | 10/1963 | Wathen | 56—377 |
| 3,245,212 | 4/1966 | Johnston | 56—377 |

ANTONIO F. GUIDA, *Acting Primary Examiner.*

ABRAHAM G. STONE, *Examiner.*

P. A. RAZZANO, *Assistant Examiner.*